United States Patent [19]

Witte

[11] 4,147,098
[45] Apr. 3, 1979

[54] APPARATUS FOR CONTINUOUS TREATMENT OF MATERIAL

[75] Inventor: Johan F. Witte, Amsterdam, Netherlands

[73] Assignee: Stork Amsterdam B.V., Amstelveen, Netherlands

[21] Appl. No.: 772,272

[22] Filed: Feb. 25, 1977

[30] Foreign Application Priority Data

Jan. 3, 1976 [NL] Netherlands ............ 7602123

[51] Int. Cl.² ............................................. A23B 7/00
[52] U.S. Cl. ......................................... 99/477; 99/483
[58] Field of Search ................ 49/483, 484, 485, 348, 49/470, 473, 477; 259/DIG. 42; 99/516, 517, 534

[56] References Cited

U.S. PATENT DOCUMENTS 2,692,200  10/1954  Olson ................................ 99/477
3,131,738   5/1964  Hind ................................. 99/483

Primary Examiner—Robert W. Jenkins
Attorney, Agent, or Firm—Haseltine, Lake & Waters

[57] ABSTRACT

An installation for treating materials, comprising a tightly closed zone having a gastight inlet- and outlet, a shaking gutter with perforated bottom plate covered by a flexible plate with apertures, the whole being accommodated in the closed zone. The flexible material is able to move from the bottom plate, so that a fluid can pass from below the bottom through the bottom and the flexible plate. A fluid inlet opens below the bottom.

The shaking gutter has a frequency of 200 to 400 vibration/minute and an amplitude from 10 to 40 mm.

14 Claims, 5 Drawing Figures

APPARATUS FOR CONTINUOUS TREATMENT OF MATERIAL

BACKGROUND OF THE INVENTION

The invention relates to an apparatus for continuous treatment of materials, whether or not under a pressure which differs considerably from the atmospheric pressure, comprising a closed treatment zone connected with a gas-tight supply device for materials and a gas-tight discharge device for materials, a conveyor within the treatment zone for conveying materials and at least one conveyor for treatment medium debouching into the treatment zone.

Such an installation for treating vegetable products is known per se.

This known installation presents the drawback that, in case of continuous sterilization of, for instance, animal flour the time during which the material stays in the apparatus is rather long, due to the fact that the animal flour to be sterilized sticks together rather compactly, so that a contact between the treating medium and the material to be sterilized is hampered, in consequence of which operations to be carried out are very time-consuming. Moreover, in some cases, the sterilization results are unsatisfactory.

When a known apparatus is used for continuous removal of vaporizable fluids from said materials, the drying process or the removal of valuable substances in the materials to be treated, which substances should be recovered during the operation, do not suffice either.

SUMMARY OF THE INVENTION

The invention aims to provide an apparatus for continuous treatment of vegetable or animal materials or the like, which ensures good sterilization results as well as an unhampered treatment of said materials and excellent drying results owing to very short staying times of said materials and minor spreadings in said staying times.

So as to attain this object the treatment zone includes a device for treating materials comprising a material support with apertures, cooperating with a vibrator for generating periodically a movement with at least one vertical vibration component, while said vibrator cooperates thus with a conveyor for supplying treatment medium that treatment medium can flow through the material support during operation of the vertical vibration component.

When the latter operation is carried out the vertical vibration component regularly separates the material particles more, while a treatment medium, for instance a sterilization medium, such as compressed steam, simultaneously penetrates into the loosened mass of material particles, and operates very efficiently.

Said efficient operation of the treatment medium is still increased by the fact that after a short period of time the supply of treatment medium is stopped causing the material particles now having treatment medium inbetween them to obtain a more dense state so that the produced mass is still influenced by the effect of the treatment medium.

The device for treating materials is constructed conveniently of at least a shaking gutter comprising a material support cooperating with a vibrator for generating a shaking movement, the latter including at least a vertical vibration component, whilst the perforated bottom of the material support has a member for closing the apertures which member moves upwards and downwards with the same frequency as the vibration component, so as to open and close the apertures in the bottom in cycles.

The present installation effects that the material particles are moved regularly from and onto each other and that the supply of treatment medium to the materials is very easily adapted while the particles can still be conveyed so that a continuous operation is ensured in a very simple manner.

Owing to a repetition in cycles of moving particles from and onto each other, the repeated contact results in an efficient transfer of heat and/or materials, so that an absolutely reliable sterilization of the materials is produced in case of sterilization by, for instance, compressed steam.

Such an installation can also recover, for instance, valuable substances from materials containing the same, for example, grape-skins comprising alcohol residues. On introducing steam, the alcohol is carried away by the treatment medium whereafter said alcohol may e.g. be recovered in a condenser. Then the material can be dried with warm air, a process known per se.

The amplitude of the shaking gutter ranges advantageously from 10 to 40 mm, the frequency of the vibrator being at most 1000 vibrations and preferably 200 to 400 vibrations/min.

The material outlet of the treatment area debouches into a drying device, preferably a flash-dryer, for drying the materials after these have been treated with, for instance, compressed steam as a sterilizing medium.

The invention also relates to a process for treating materials, such as vegetable or animal materials or the like in a sealed zone having a gas-tight material inlet- and outlet with a gaseous treatment medium, wherein the materials are periodically subjected to the action of a vertical vibration component whereupon gaseous medium is injected into the separated material particles while injection of the treatment medium is discontinued after cutting off the vertical vibration component.

The invention, moveover, relates to a process of continuous sterilization of materials, such as animal meal, vegetable products or the like, under a pressure exceeding the atmospheric pressure, in a sealed treatment zone having a gas-tight material supply and a gas-tight material discharge, materials to be sterilized being conveyed through a closed treatment zone in which the materials are subjected to a shaking movement comprising a vertical vibration component, said vertical vibration component opening and closing apertures in a support for materials to be treated in cycles, the material particles being regularly moved from and toward each other while, in an open position of the apertures, treatment medium is injected through these apertures into the mass of loosened material particles.

The present invention further comprises a shaking gutter, the bottom of which consisting of a perforated rigid plate covered by a plate of flexible material with perforations which are closed by the rigid plate due to juxtaposed perforations in the rigid plate and in the plate of flexible material, the plate of flexible material being affixed to the rigid plate such that under the action of a vertical vibration component the flexible plate will move at least partially from the rigid plate thus uncovering the perforations in the rigid plate.

SURVEY OF THE DRAWINGS

FIG. 1 schematically shows an installation according to the invention,

DESCRIPTION OF PREFERRED EMBODIMENTS

Figure 2:
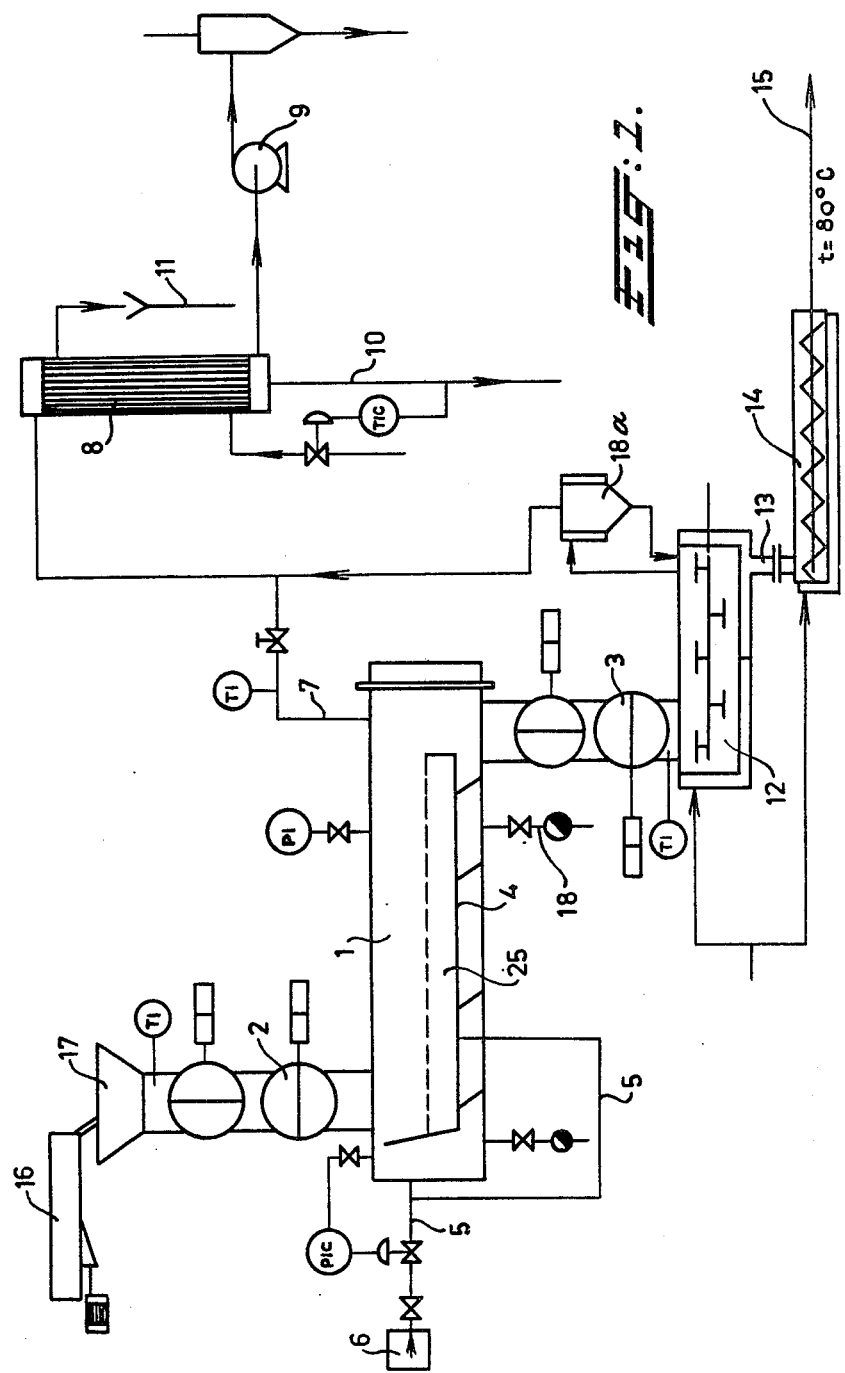
FIG. 2 shows a shaking gutter as used in the installation according to the invention.
Figure 2:
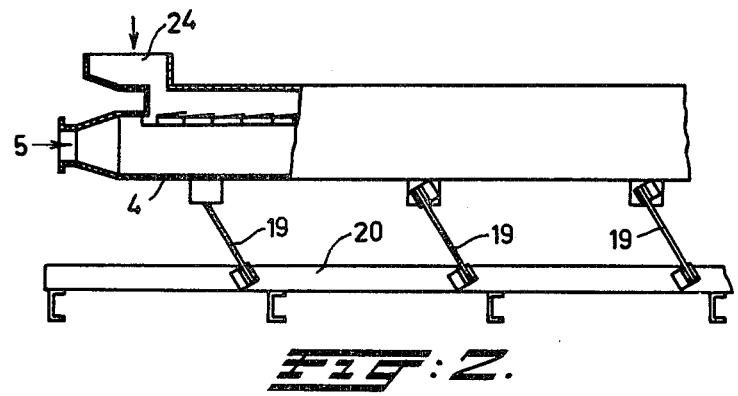
Figure 3:
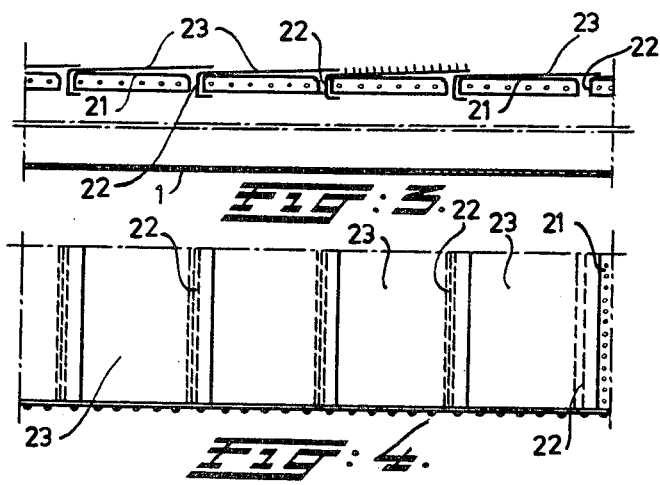
FIG. 3 shows a longitudinal section of the conveying surface of said shaking gutter.
Figure 4:
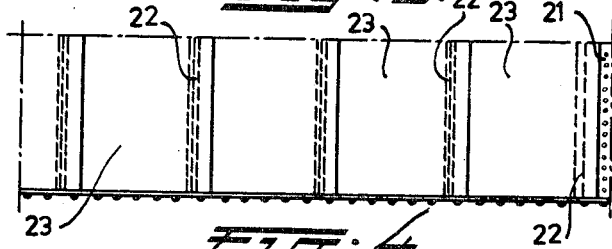
FIG. 4 shows a plan view of the conveying surface of shaking gutter as used in the plant according to the inventions.

FIG. 1 shows an installation for the continuous treatment of materials, in this case for sterilizing animal meal with high-pressure steam.

The present apparatus comprises a tightly closed treatment zone 1 connected with a gas-tight device 2 for supplying materials. This gas-tight material supply is connected with a feeding hopper 17 which is fed with animal meal to be sterilized by means of a dispenser 16.

Since in the treatment zone 1 operations are carried out with high-pressure steam, a gas-tight material supply 2 is essential so as to prevent steam to escape from the treatment zone.

The gas-tight device 2 for feeding materials is therefore a sluice for receiving materials like for instance animal meal to be sterilized.

On the other hand, the sealed treatment zone 1 has a gas-tight material discharge device 3 for discharging materials, this device also being a sluice through which the treated material is discharged from the sealed zone 1.

For sterilizing materials, such as for instance animal meal, which is fed through the gas-tight supply device 2 a steam injector 5 is connected with a source of compressed steam 6.

Steam injector 5 debouches efficiently into a space 25 below a device 4 for conveying materials which is located in the sealed treatment zone. This conveyor 4 is constructed of a shaking gutter comprising a frame supported by flexible strips 19 the lower portions of which are affixed to the bottom 20 of the shaking gutter, while their upper portions are connected with the gutter proper. Strips 21 of perforated material are provided between the side walls of the shaking gutter. These strips 21 constitute a horizontal bottom, while between each pair of adjacent strips a strip 23 of thin, flexible, skinlike material is placed at point 22 extending on the one metal strip 21 to the adjacent flexible strip 19.

Figure 5:
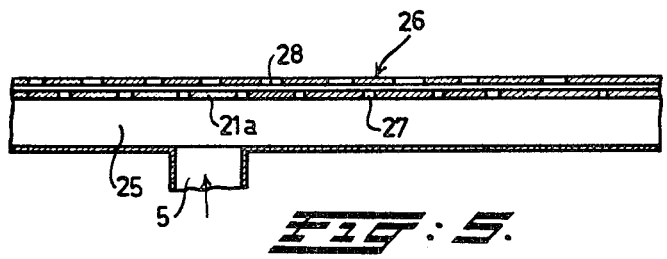
FIG. 5 shows a cross-section of part of another embodiment of the shaking gutter.

In the embodiment of FIG. 5, there is a bottom comprising a perforated metal plate 21a with apertures 27 on which a flexible plate 26, for instance of Teflon with finer perforations is positioned. The flexible plate 26 is mounted on the end portions of the metal plate, i.e. end portions 29 and 30. Apertures 28 in the flexible plate 26 and in the metal plate 21a are located juxtaposed with respect to each other thus that all apertures in plate 21a and plate 26 are closed when being non-operative. By the action of a vertical vibration component the flexible plate 26 is lifted (except the end portions 29 and 30) and moved from metal plate 21a due to which the particles present on plate 26 are thrown upwards and loosened from each other. Simultaneously treatment fluid then flows through the apertures 27 in metal plate 21a and through apertures 28 in the flexible plate, into the loosened mass of material particles. Shortly afterwards, when the vertical vibration component generated by strips 19 has been cut, the flexible plate will adjoin the metal plate 21a again, due to which the material particles will land upon each other again.

At one of its end zones the shaking gutter is connected to a steam injection line 5 for injecting a sterilization medium, or sometimes a drying gas, underneath the bottoms 21 or 21a into zone 25.

The material to be treated is conveyed to the gutter through an inlet 24.

The shake-frequency of the gutter amounts at most to 1000 vibrations/min. and is efficient, from 200 to 400 vibrations/min., whereas the total amplitude of the gutter amounts to at least 10 mm and at most 40 mm. The minimal amplitude amounts to 5 mm. The shake-frequency and the amplitude to be applied are dependent on the material to be treated. For fibrous products the frequency and amplitude amount to 200 to 400, respectively 20 to 40 mm, whereas for granular material which does not stick the frequency is at most 1000, and the amplitude 5 mm.

It will be obvious that the above plant should not be confused with a vibration gutter in which the frequency amounts to 3000 and the amplitude to at most 1 mm.

The sealed treatment zone 1 may have a condensation outlet 18 and a gas outlet 7 from which the gas still present after sterilization with for instance steam may escape, and is then condensed in condenser 8.

Condensate from the condenser is carried off through a condensate discharge line 10 and valuable substances, if any, can be recovered from the condenser through an outlet 11.

An air pump 9 is mounted for a good air exhaust of the plant.

After sterilization, the materials leaving the gas-tight material-discharge device 3 land in a flash dryer 12 from which they arrive in a transport cooling screw 14 through outlet 13.

This transport-cooling screw 14 has an outlet 15 through which the sterilized materials disappear.

Should the materials leaving the treatment zone 1 be too moist a drying operation is carried out. When sterilizing materials in a treatment zone 1, for instance animal meal, this material has a moisture contents of e.g. 12% after having passed outlet 3. Since the admissible moisture contents of the final product must not exceed e.g. 9% afterdrying is done in a flash dryer which is used for such an afterdrying operation.

The steam from the source of steam 6 used for sterilizing has a temperature of 135° C. and this moist steam is injected into the gutter.

It has been found that in this way a very good sterilization is produced.

For such a sterilization the pressure in the treatment zone amounts to 2.2 ato.

The apparatus as described hereinbefore can also be used for recovering alcohol, from for instance alcohol-comprising grape skins, to which aim the wet skins are subjected to the action of steam from a steam source 6. In that case, gas leaving the treatment zone 1 at outlet 7 will flow into a condenser 8 from which the alcohol is recovered. Subsequently the skins are dried by means of dry air.

The shaking gutter in the present plant mostly has a total amplitude of 30 mm and a frequency of 300 vibrations/min.

EXAMPLE I

An installation with a shaking gutter as shown in FIG. 5, receives hourly 1 ton of grape skins still comprising alcohol residues. Steam with a temperature of 110° C. is introduced below bottom 21a through a steam inlet 5. The gutter undergoes a total amplitude of 30 minutes and shakes with a frequency of 300 vibrations/min.

Owing to the action of the steam alcohol remnants still present are carried off and recovered by condensation in a condenser 8. The grape pressing may also be heated in a shaking gutter and heated to higher temperatures in order to coagulate colloidal and colouring substances before extracting the pressings for recovering tartrate salts.

EXAMPLE II

Wine lees is pelletized and alcohol residues removed by steam. Thereafter the wine lees material in pelletized form is roasted for improving extraction of salts by means of water. This roasting is effected by means of hot air fed to the shaking gutter.

EXAMPLE III

A shaking gutter's bottom as applied in Example I is charged hourly with 10 tons of fish meal. The sterilization medium is high-pressure steam of 2.2-ato. After the sterilization the fish meal is perfectly germ-free. In known plants duration of the sterilization treatment is thrice as long.

What is claimed is:

1. An apparatus for continuous treatment of vegetable materials and the like whether or not under a pressure which differs considerably from the atmospheric pressure, comprising: a tightly closed treatment zone means connected with gas-tight means for discharging materials and at least one inlet means for treatment medium debouching into said treatment zone, said treatment zone means being defined by a device for treating materials having a material support with apertures for cooperation with vibrator means for imparting periodic movement having at least one vertical vibration component, said vibrator means being adapted to cooperate with said inlet means permitting said treatment medium flow through said material support during the action of said vibrator means.

2. An apparatus as defined in claim 1, wherein: said device for treating materials being formed of at least one shaking gutter having a material support in cooperative relationship with said vibrator means for generating a shaking movement having at least one vertical vibration component, whilst the said material support having a perforated bottom cooperating with a member for closing the apertures which member moves upwards and downwards with the same frequency as said vibrator means, to thereby open and close in cyclical fashion the apertures in said bottom.

3. The installation as defined in claim 2, wherein; said amplitude of the shaking gutter ranges from 10 to 40 mm.

4. An installation as defined in claim 2, wherein: said member for closing said apertures is flexible and connected to the bottom of support means permitting it to move flexibly from the bottom under the action of the vertical vibration component.

5. The installation as defined in claim 1, wherein: said inlet means for treatment medium being connected to a source of sterilization medium.

6. An installation as defined in claim 5, wherein: said inlet means for treatment medium is connected to a steam source.

7. The installation as defined in claim 6, wherein: said steam source being a source of compressed steam.

8. The installation as defined in claim 1, wherein: said treatment zone being formed of a gas outlet.

9. The installation as defined in claim 8, wherein; said gas-outlet being connected with a condenser.

10. The installation as defined in claim 1, wherein: the frequency of the vibrator means being 200 to 400 vibrations/min.

11. The installation as defined in claim 1, wherein; said material outlet debouches into a drying device.

12. An installation as defined in claim 11, wherein; said drying device is a flash dryer.

13. The installation as defined in claim 1, wherein: said inlet means for treatment medium debouches under the bottom of said support means.

14. The installation as defined in claim 1, wherein: the frequency of the vibrator means being at most 1000 vibrations/min.

* * * * *